(12) United States Patent
Fukumoto et al.

(10) Patent No.: US 11,196,883 B2
(45) Date of Patent: Dec. 7, 2021

(54) PRINTER WITH COVER TO PROTECT CONNECTION OF EXTERNAL CABLES

(71) Applicant: SEIKO EPSON CORPORATION, Tokyo (JP)

(72) Inventors: Hiroaki Fukumoto, Miyazaki (JP); Kazuo Otsuka, Azumino (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/124,761

(22) Filed: Dec. 17, 2020

(65) Prior Publication Data

US 2021/0195042 A1  Jun. 24, 2021

(30) Foreign Application Priority Data

Dec. 20, 2019 (JP) .............................. JP2019-230173

(51) Int. Cl.
*G06F 3/12* (2006.01)
*H04N 1/00* (2006.01)
*H01H 9/04* (2006.01)

(52) U.S. Cl.
CPC ..... *H04N 1/00551* (2013.01); *H04N 1/00533* (2013.01); *H01H 9/045* (2013.01); *H04N 2201/0094* (2013.01)

(58) Field of Classification Search
CPC ........... H04N 1/00551; H04N 1/00533; H04N 2201/0094; H01H 9/045

USPC ................................ 358/1.1–1.18, 474, 296
See application file for complete search history.

(56) References Cited

U.S. PATENT DOCUMENTS

| | | | | |
|---|---|---|---|---|
| 4,449,015 A | * | 5/1984 | Hotchkiss | H02G 3/10 174/138 F |
| 2011/0211300 A1 | * | 9/2011 | Mori | G06F 1/1656 361/679.01 |
| 2013/0083354 A1 | * | 4/2013 | Muraki | H04N 1/00302 358/1.15 |
| 2017/0251117 A1 | | 8/2017 | Shirota et al. | |

FOREIGN PATENT DOCUMENTS

JP  2017-149096  8/2017

* cited by examiner

*Primary Examiner* — Gabriel I Garcia
(74) *Attorney, Agent, or Firm* — Workman Nydegger (57) ABSTRACT

A printer includes a board including a connector to which a cable is connected, and a housing covering the board and having an opening through which the connector is accessible, wherein a cable gripping portion that is gripped when the cable is connected is located outside the opening in a state where the cable is connected to the connector, and in which the housing includes a connector cover movable to a cover position at which the connector cover covers an upper side and a lateral side of the cable gripping portion, and an open position at which the connector cover opens at least on a vertical upper side of the cable gripping portion.

7 Claims, 6 Drawing Sheets

PRINTER WITH COVER TO PROTECT CONNECTION OF EXTERNAL CABLES

The present application is based on, and claims priority from JP Application Serial Number 2019-230173, filed Dec. 20, 2019, the disclosure of which is hereby incorporated by reference herein in its entirety.

BACKGROUND

1. Technical Field

The present disclosure relates to a printer.

2. Related Art

In the related art, there is known a printer including a board provided with a connector for connecting a LAN cable and a USB cable. For example, JP 2017-149096 A discloses a printer having a configuration in which an opening for connecting a connector is provided rearward from a lateral side of a housing.

When the board is disposed at a position spaced apart from a back face of the housing, the opening to the connector is provided frontward from the back face of the housing, as in a configuration of JP 2017-149096 A. Further, in consideration of a layout of a paper sheet transport path, an opening to the connector is provided on the lateral side of the housing, as in the configuration of JP 2017-149096 A. Unfortunately, when the opening to the connector is provided at a concave portion having a face at the upper side, the finger or hand of a user to be inserted into the concave portion may touch, when the user uplifts the printer, the cable connected to the connector through the opening. At this time, an excessive load is applied to the cable and the connector, and thus there is a risk that the cable and the connector may be damaged.

SUMMARY

A printer includes a board including a connector to which a cable is connected, and a housing covering the board and having an opening through which the connector is accessible, wherein a cable gripping portion that is gripped when the cable is connected is located outside the opening in a state where the cable is connected to the connector, and in which the housing includes a connector cover movable to a cover position at which the connector cover covers an upper side and a lateral side of the cable gripping portion, and an open position at which the connector cover opens at least on a vertical upper side of the cable gripping portion.

DESCRIPTION OF EXEMPLARY EMBODIMENTS

A configuration of a printer 11 according to an embodiment will be described. Note that the printer 11 described in the embodiment is an inkjet printer of a serial recording type. In coordinates appended in the drawings, three virtual axes orthogonal to each other are designated as X, Y, and Z axes, respectively, assuming that the printer 11 is placed on a horizontal face. The X axis is a virtual axis parallel to a scanning direction in which a recording head 26 performs scanning, which will be described later, and a tip end side of an arrow indicating the X axis is designated as "left". The Y axis is a virtual axis parallel to a transport direction Y1 in which a recording medium is transported when performing printing, and a tip end side of an arrow indicating the Y axis is designated as "front". The Z axis is a virtual axis parallel to a vertical direction, and a tip end side of an arrow indicating the Z axis is designated as "upper".

Figure 1:
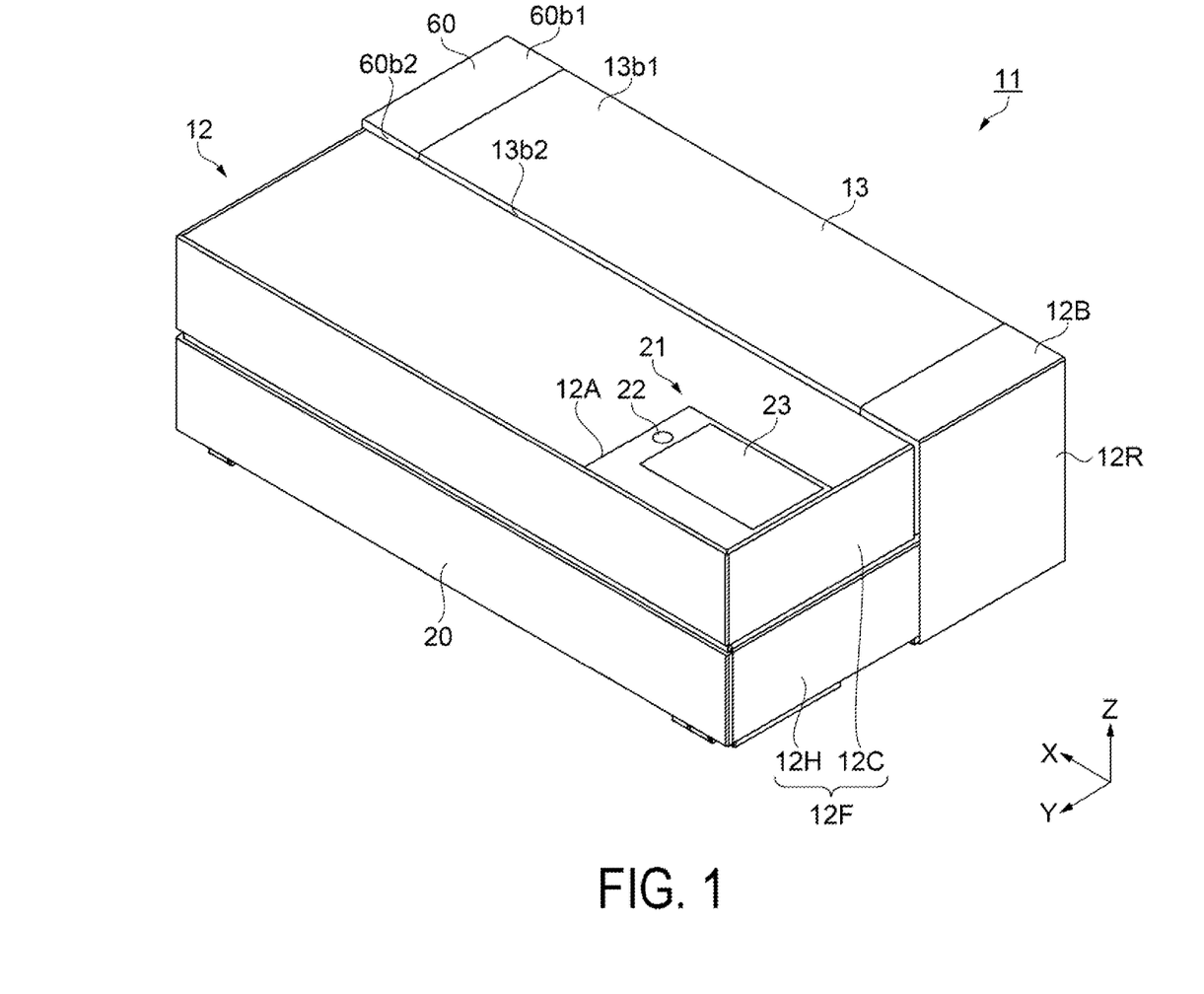
FIG. 1 is a perspective view illustrating an external appearance of a printer according to an embodiment.
Figure 2:
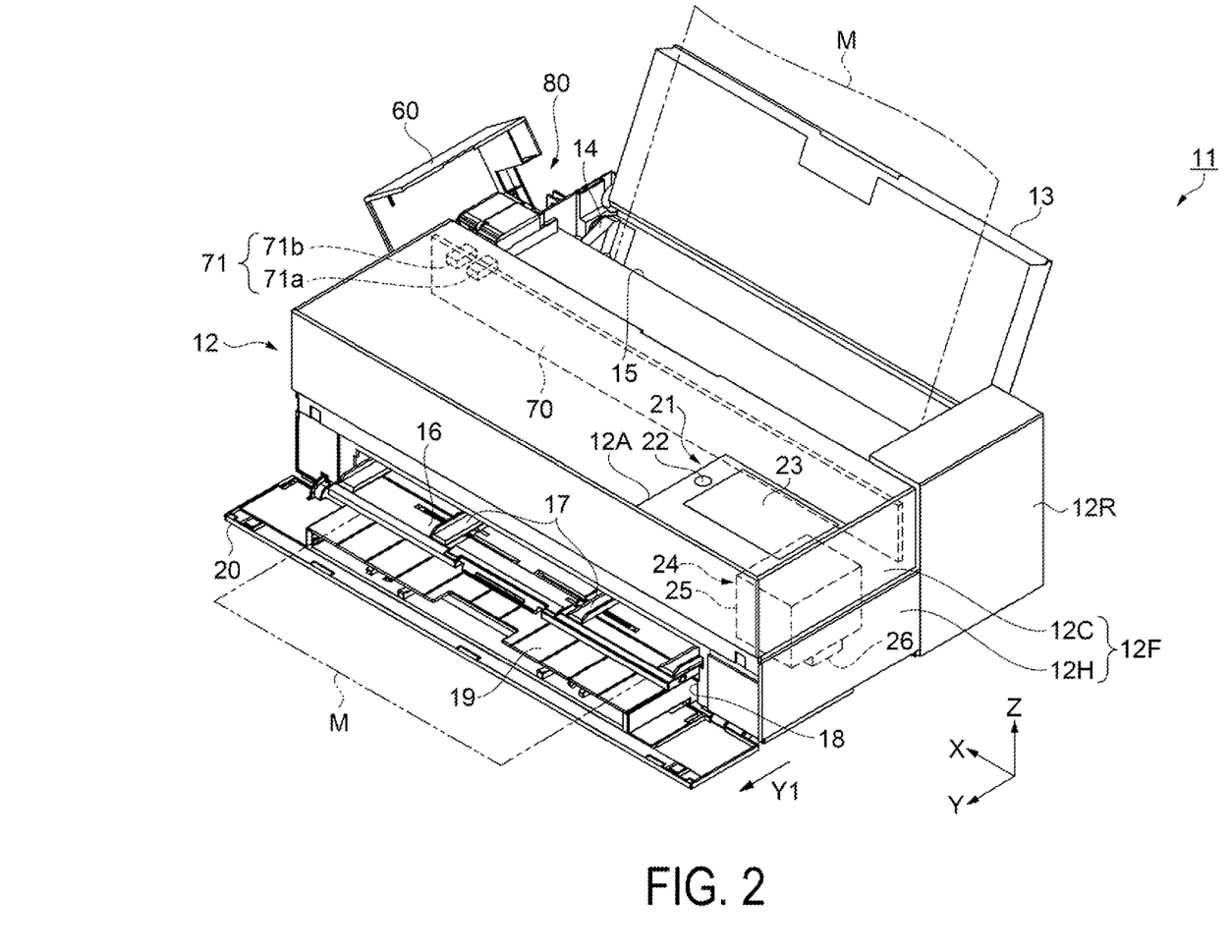
FIG. 2 illustrates a perspective view illustrating a schematic configuration of a printer.

As illustrated in FIGS. 1 and 2, the printer 11 includes a housing 12 molded from a synthetic resin or the like, for example. The housing 12 has a front housing 12F covering the front of the printer 11 and a rear housing 12R covering the rear of the printer 11. The front housing 12F and the rear housing 12R are formed to have a rectangular parallelepiped shape that is long in the X axis.

The front housing 12F is constituted by a housing 12H of a box shape configure to open at an upper side and a cover 12C configured to open and close an upper side opening of the housing 12H. A front face of the housing 12H is provided with a lid body 20 of an open/close type.

The rear housing 12R has a feeding port 15 at the upper face through which a recording medium M of a single sheet is fed into the housing 12. The feeding port 15 is caused to open and close by a first feeding tray 13 that will be described later. The feeding port 15 is caused to open and close by a first feeding tray 13 that will be described later. The concave portion 80 is caused to open and close by a connector cover 60 configured to pivotally move toward the left lateral side. In addition, the rear housing 12R is configured to couple with a roll paper feeding mechanism 90 storing the recording medium M in a rolled form at a back face of the rear housing 12R. Note that FIG. 3 illustrates a schematic cross-sectional view of a state where the roll paper feeding mechanism 90 is connected to the rear housing 12R.

Figure 3:
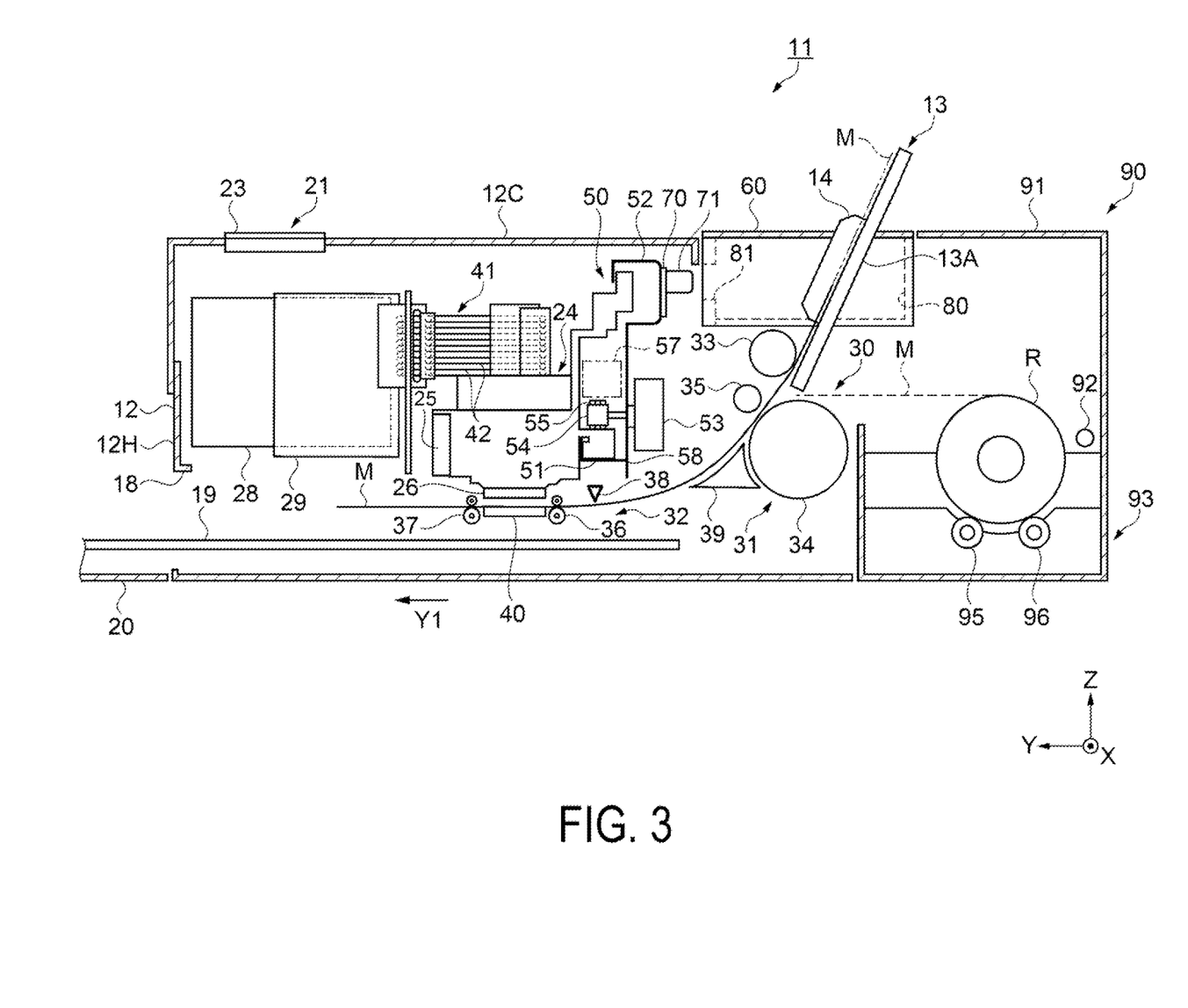
FIG. 3 is a cross-sectional view schematically illustrating an internal configuration of a printer.

As illustrated in FIGS. 1 to 3, at a rear end of the feeding port 15, the first feeding tray 13 as a medium support portion at which a user can set the recording medium M on which recording is to be performed is provided in a pivotally movable manner. The first feeding tray 13 is movable to a support position at which the first feeding tray 13 supports the recording medium M and a non-support position different from the support position. The first feeding tray 13 is a multi-slide tray to which a plurality of tray members are slidably coupled.

The support position of the first feeding tray 13 represents a state where the plurality of tray members are slid from a contraction state illustrated in FIG. 2 to be in a state of being elongated, thus causing a transport mechanism 30 configured to transport the recording medium M to be in communication with the first feeding tray 13. This allows the recording medium M placed on the first feeding tray 13 to be fed into the housing 12 through the feeding port 15.

The non-support position of the first feeding tray 13 represents a state where the first feeding tray 13 is pivotally moved from the contraction state illustrated in FIG. 2 to a horizontal posture, to be in a state of closing the feeding port 15 as illustrated in FIG. 1, thus blocking the communication between the transport mechanism 30 and the first feeding tray 13. An upper face of the first feeding tray 13 at the non-support position at which the first feeding tray 13 closes the feeding port 15 is included in an identical plane to an upper face 12B of the rear housing 12R, to function as a part of the rear housing 12R as well. Note that the identical plane tolerates errors due to processing accuracy and assembly accuracy at each of the portions. Also, the upper face of the first feeding tray 13 at the non-support position is set higher than an upper face of the front housing 12F. This allows the user to hang a finger at a front end portion of the first feeding tray 13 at the non-support position, which enables the pivotal movement of the first feeding tray 13 with ease when opening the feeding port 15.

As illustrated in FIG. 2, a front portion of the housing 12H is provided with a second feeding tray 16 configured to feed the recording medium M that has been set from the front. The second feeding tray 16 includes a pair of edge guides 17 operable when positioning the recording medium M in the width direction.

A lower part of the second feeding tray 16 is provided with an ejection port 18 through which the recording medium M on which recording has been performed is ejected, and an ejection tray 19 in which the recording medium M on which recording has been performed, which has been ejected through the ejection port 18, is loaded. The ejection tray 19, which is of a slide type to which a multi-tray is slidably coupled, is used in an extension state where the multi-tray is slid to be extended from the contraction state illustrated in FIG. 2. Note that when the second feeding tray 16 and the ejection tray 19 are stored inside the housing 12, the front face of the housing 12H is covered by the lid body 20.

The cover 12C is provided with an opening 12A that exposes an operation panel 21. The operation panel 21 includes an operation unit 22 such as a power button, and a display unit 23 composed of a liquid crystal display and the like. On the display unit 23, menus, various types of messages, and the like are displayed. Opening of the cover 12C enables to perform maintenance operations including a jam removal operation of the recording medium M being jammed inside the housing 12, a replacement operation of replacing a liquid container 28 that will be described later, and the like.

The front housing 12F is provided with a recording unit 24 configured to discharge a liquid such as ink onto the recording medium M to perform recording. The recording unit 24 includes the recording head 26 configured to discharge a liquid onto the recording medium M, and a carriage 25 configured, supporting the recording head 26, to move in a scanning direction X along the X axis. The printer 11 is configured to alternately perform, in the course that the recording unit 24 moves in the scanning direction X, a recording operation that the recording head 26 discharges droplets to perform recording for one pass, and a transport operation of transporting the recording medium M in the transport direction Y1 intersecting the scanning direction X to the next recording position, to thus record an image or a character on the recording medium M. Note that the scanning direction X includes a first direction X1 and a second direction X2 because the recording unit 24 reciprocally moves.

As illustrated in FIG. 3, the transport mechanism 30 configured to transport the recording medium M placed on the feeding trays 13 and 16 is provided inside the housing 12. Note that in FIG. 3, illustration of the second feeding tray 16 is omitted. The first feeding tray 13 includes a feeding path 13A inclined toward a rear upper side inside the housing 12, and a pair of edge guides 14 operable when positioning the recording medium M in the width direction. The multi-tray constituting the first feeding tray 13 extends along the feeding path 13A to protrude from the housing 12.

The transport mechanism 30 includes a feeding unit 31 configured to feed the recording medium M, and a transport unit 32 configured to receive the recording medium M fed from the feeding unit 31, and to transport the recording medium M in the transport direction Y1. The feeding unit 31 includes the first feeding tray 13, a feeding roller 33 configured to feed a plurality of recording medium M, one by one, set in the first feeding tray 13, and an intermediate roller 34 and a driven roller 35 configured to feed, while nipping the recording medium M, the recording medium M fed by the feeding roller 33. The intermediate roller 34 and the driven roller 35 are configured to rotate, while nipping the recording medium M, to feed the recording medium M to a recording region where the recording head 26 performs recording.

The transport unit 32 includes two roller pairs 36 and 37. That is, the transport unit 32 includes a transport roller pair 36 and an ejection roller pair 37 located downstream in the transport direction Y1 of the transport roller pair 36. A support stage 40 for supporting a recording region of the recording medium M onto which a liquid is discharged from the recording head 26 is disposed in the transport direction Y1 between the two roller pairs 36 and 37. A plurality of nozzles open at a face, facing the support stage 40, of the recording head 26. The support stage 40 is constituted by an elongated plate-like member extending along a movement path on which the recording head 26 moves. The recording head 26 is configured to discharge a liquid onto the recording region of the recording medium M supported by the support stage 40, and to record an image and a character on the recording medium M.

A medium detector 38 configured to detect whether the recording medium M is present is disposed, at a position downstream of the feeding unit 31 and upstream of the transport roller pair 36, on the transport path on which the transport mechanism 30 transports the recording medium M, Further, at a position between the intermediate roller 34 and the transport roller pair 36 in the transport path, there is disposed a guide member 39 that forms a part of the transport path and guides the recording medium M. When performing printing on both faces of the recording medium M, the ejection roller pair 37 is reverse-rotated to cause the recording medium M to be reverse-transported toward upstream in the transport direction Y1 after printing is performed on a first face of the recording medium M. The recording medium M, by being inverted along an outer circumference of the intermediate roller 34 via a path below the guide member 39, is fed back toward the recording region, with a second face opposite to the first face of the recording medium M facing upward. Then, the recording medium M, on the both faces of which the recording has been performed, is discharged through the ejection port 18. The recording medium M set in the second feeding tray 16 is also fed to the recording region by passing through an inversion path that is the same as the path on which the recording medium M is fed back toward the recording region when performing printing on the both faces of the recording medium M.

Next, the roll paper feeding mechanism 90 that is couplable to the housing 12 will be described. As illustrated in FIG. 3, the roll paper feeding mechanism 90 is stored at a region below the feeding path 13A and rearward from the feeding roller 33. The roll paper feeding mechanism 90 is coupled to the housing 12 to cause the transport mechanism 30 to be in communication with the roll paper feeding mechanism 90. This allows the recording medium M having an elongated form that has been unwound from a roll body R to be fed into the housing 12.

The roll paper feeding mechanism 90 includes a housing 91. The housing 91 is configured, by pivotally moving at an upper part of the housing 91 about a rotation shaft 92, to open and close to be storable of the roll body R.

The roll paper feeding mechanism 90 includes a storage portion 93 for storing the roll body R. The storage portion 93 is located inside the housing 91. The housing 91 opens to expose the storage portion 93. The roll body R is stored in the storage portion 93 to be set to the roll paper feeding mechanism 90.

The roll paper feeding mechanism 90 includes a roll body driving roller 95 that makes contact with an outer circumferential face of the roll body R, and a roll body driven roller 96 that makes contact with the outer circumferential face of the roll body R at a position different from the position at which the roll body driving roller 95 makes contact with the outer circumferential face of the roll body R. The roll body driving roller 95 and the roll body driven roller 96, which are provided at the storage portion 93, support the roll body R from below.

The roll body driving roller 95 is configured to make contact with the outer circumferential face of the roll body R with no slippage with respect to the roll body R to apply rotation torque to the roll body R for rotating the roll body R in a direction of unwinding the recording medium M. The roll body driving roller 95 is also configured to apply, to the roll body R, the rotation torque for rotating the roll body R in a direction of winding the recording medium M. The roll body driven roller 96 is driven to rotate in conjunction with the rotation of the roll body. The recording medium M unwound from the roll paper feeding mechanism 90 reaches the transport roller pair 36 along the outer circumference of the intermediate roller 34, to be fed to the recording region.

Note that the feeding unit 31 is not limited to be of a type having the feeding trays 13 and 16, and may also be of a cassette feeding type having a cassette detachably stored at a lower part of the housing 12, and a pickup roller configured to feed out an uppermost one of the recording mediums M stored in the cassette. Also, the printer 11 may be configured to include, at a position near the ejection port 18 inside the housing 12, a cutter mechanism configured to cut the recording medium M having an elongated form that is unwound from the roll body and on which recording has been performed in the recording region to a predetermined size.

As illustrated in FIG. 3, the recording unit 24 is movably supported along the X axis by a movement mechanism 50. The movement mechanism 50 includes a pair of upper and lower rail members 51 and 52 disposed inside the housing 12, a carriage motor 53, as a drive source of the carriage 25, guided by the pair of upper and lower rail members 51 and 52 to move along the X axis, and a pair of pulleys 54 and a timing belt 55 configured to transmit a power of the carriage motor 53 to the carriage 25. The carriage 25, which is supported by the pair of upper and lower rail members 51 and 52 inside the housing 12, is movably guided along the X axis. The carriage motor 53 is disposed at one end portion and a rearward position of a movement path on which the carriage 25 moves.

At a rearward position of the movement path on which the carriage 25 moves, there are provided the pair of pulleys 54 located at a predetermined distance in a direction along the X axis, and the timing belt 55 of an endless shape extending along the X axis in a state of being wound around the pair of pulleys 54. One of the pair of pulleys 54 is coupled to an output shaft of the carriage motor 53. When the carriage motor 53 is forward/reverse driven, the recording unit 24 reciprocally moves along the X axis. That is, the recording unit 24 reciprocally moves in the first direction X1, which is one direction along the X axis, and the second direction X2, which is a direction opposite to the first direction X1.

In addition, the printer 11 includes a gap adjustment mechanism 57 configured to adjust a gap between the recording head 26 and the support stage 40. The gap adjustment mechanism 57, which is of an electrically or mechanically driven type, is configured to adjust a height position, which is a position in a Z direction along the Z axis of the recording head 26 set in accordance with a medium type of the recording medium M, to thus adjust a gap between the recording head 26 and the recording medium M. Note that the rail members 51 and 52 are formed by a part of a main frame 58 formed of metal extending in an X direction inside the housing 12.

The printer 11 includes a board 70 configured with a control unit configured to control operations of the printer 11. The board 70, which has a plate shape elongated in the X direction, is provided at a back face of the main frame 58 between the recording unit 24 and the feeding path 13A that is inclined, and in an upper region inside the housing 12. The printer 11, which stores the roll paper feeding mechanism 90 below the feeding path 13A, needs to provide the board 70 at a position spaced apart from a back face of the housing 12. The printer 11 of the embodiment takes effective use of a space below the feeding path 13A inclined rearward as an installation space for installing the roll paper feeding mechanism 90, and a space above between the feeding path 13A and the recording unit 24 as an installation space for installing the board 70, to thus miniaturize an overall size of the apparatus.

As illustrated in FIG. 3, inside the housing 12, there is provide, downstream in the transport direction Y1 of the recording unit 24, a mounting portion 29 to which the liquid container 28 storing a liquid supplied to the recording unit 24 is mountable. The mounting portion 29 is disposed at a height position above a left front portion inside the housing 12, and the ejection port 18. The mounting portion 29 is detachably mounted with a plurality of the liquid containers 28 corresponding to types of the liquid. Note that in this example, the liquid container 28 is of an off-carriage type that is disposed at a position separate from the carriage 25. The liquid inside the liquid container 28 is supplied through a tube 42 to the recording head 26 of the recording unit 24. The tube 42 is a flexible tube member. The tube 42 is composed of a synthetic resin material, for example. A plurality of the tubes 42 coupled to each of the liquid containers are joined together in a state of being aligned in a row in the Z direction to form a band-like tube bundle 41, where the Z direction coincides with a direction in which the plurality of the tubes 42 are aligned.

Note that in the embodiment, the printer 11 of a serial-head type is exemplified, in which the recording head 26 is mounted on the carriage 25 configured to discharge a liquid while reciprocally moving in the scanning direction X, and, the printer 11 may also be a line-head type printer in which the recording head 26 extends in the width direction of the recording medium M and aligned in a fixed manner.

Next, the concave portion 80 provided at the rear housing 12R and the connector cover 60 covering the concave portion 80 will be described.

As illustrated in FIGS. 2 and 3, the board 70 includes a connector 71 to which a cable 82 is connected. The connector 71 is located outward, in the width direction along the X axis of the housing 12, from the width of the feeding path 13A and the roll body R. In the embodiment, a female-side connector 71a corresponding to a LAN cable and a female-side connector 71b corresponding to a USB cable are installed to a left end portion of the board 70. As such, the connector 71 is provided at a position, in the scanning direction X, deviated from the feeding path 13A, to thus miniaturize a dimension in the Y direction and a dimension in the Z direction of the apparatus.

Figure 4:
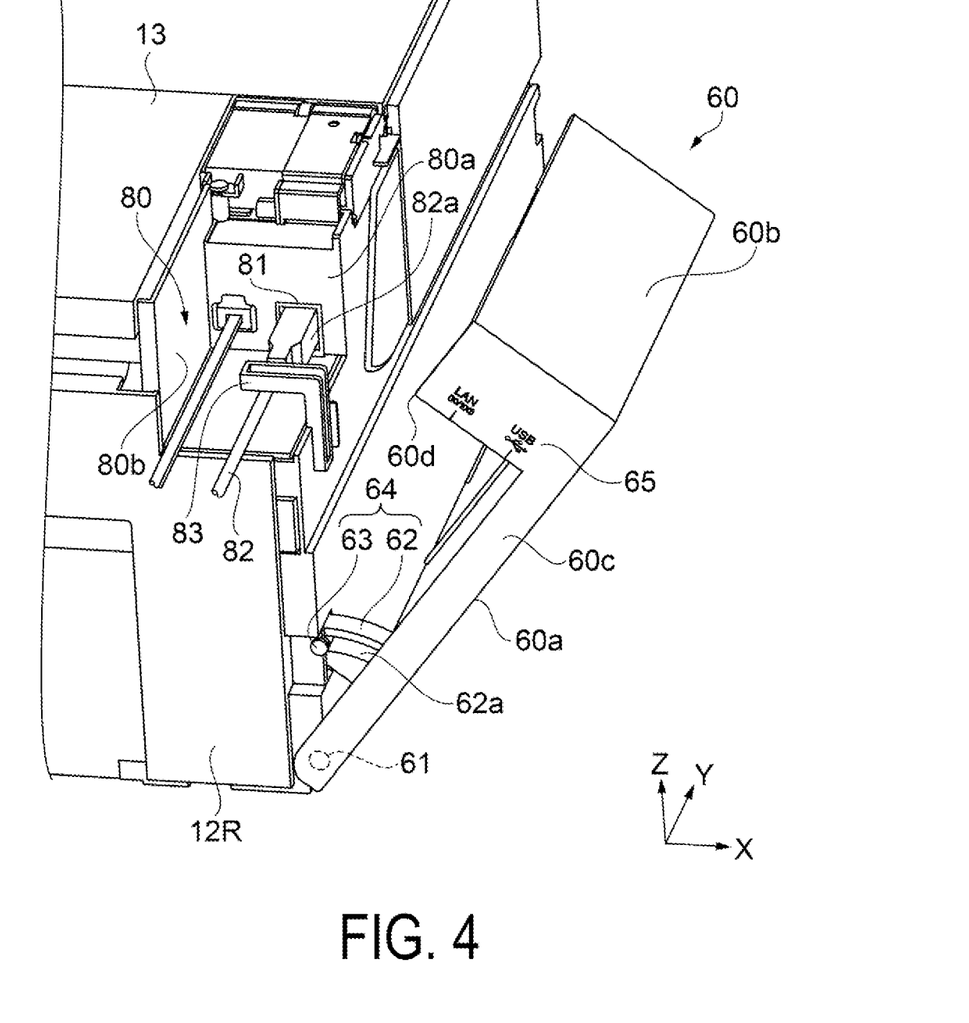
FIG. 4 is a perspective view illustrating a configuration of a connector cover at an open position.
Figure 5:
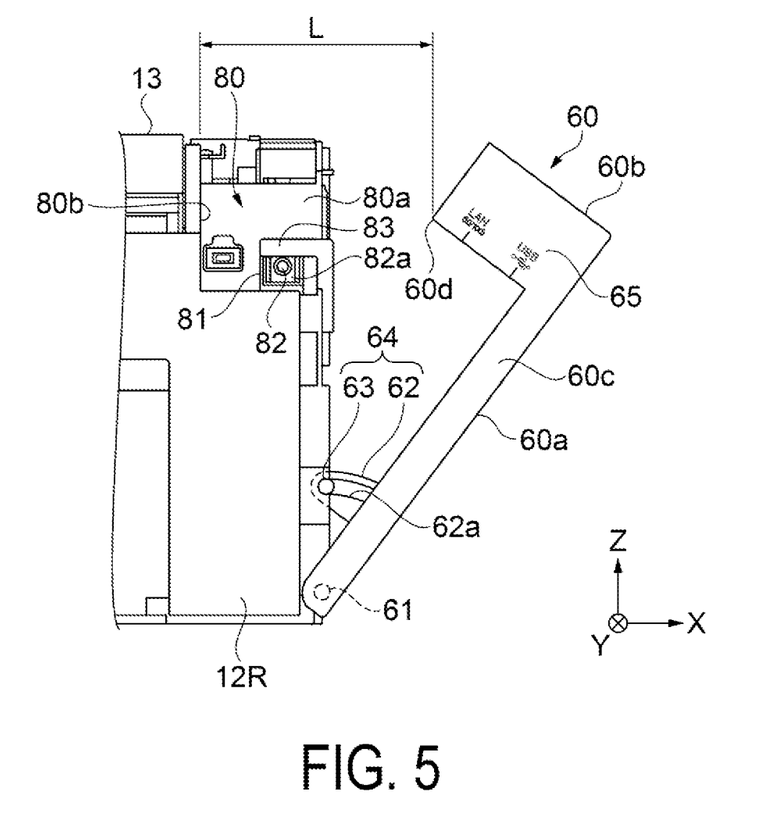
FIG. 5 is a side view illustrating a configuration of a connector cover at an open position.

As illustrated in FIGS. 4 and 5, a rear side wall forming the concave portion 80 is provided with an opening 81 that is through which the connector 71 is accessible. The rear side wall includes an opening face 80a at which the opening 81 is formed. The cable 82 includes a cable gripping portion 82a that is gripped when the cable 82 is connected. A male-side connector, which is installed to a tip of the cable gripping portion 82a, is connected through the opening 81 to the female-side connector 71 installed to the board 70. The cable gripping portion 82a is located at the concave portion 80 being outside the opening 81 in a state where the cable 82 is connected to the female-side connector 71. Further, the concave portion 80 is provided with a cable restricting portion 83 covering, in an inverted L-shaped state, the cable 82 located at the concave portion 80. The cable restricting portion 83 is configured, when the cable 82 having a winding habit is used, to restrict the cable 82 from protruding from the upper side or the lateral side of the concave portion 80 to guide the cable 82 to the rear side of the concave portion 80.

Figure 6:
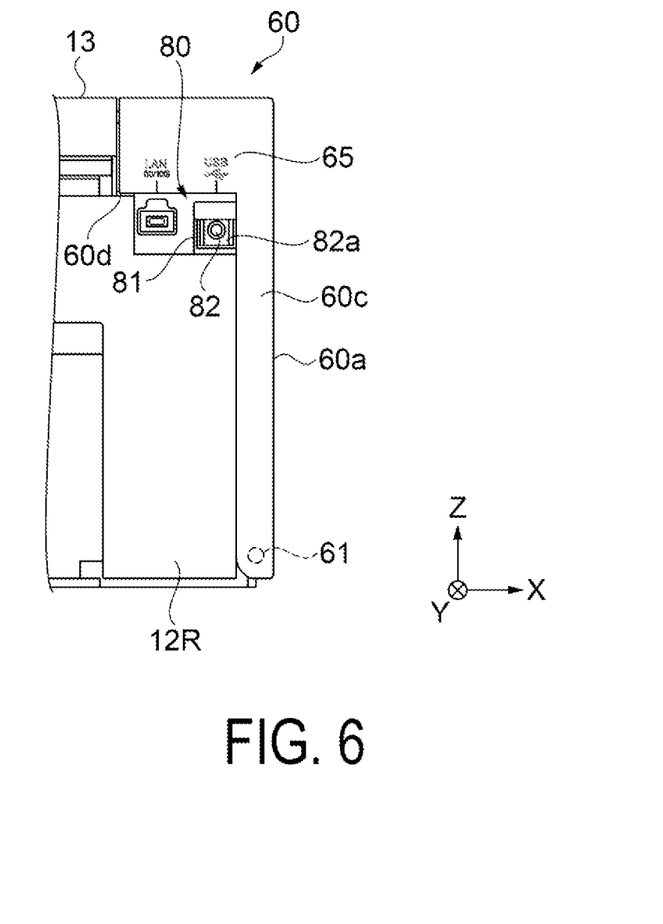
FIG. 6 is a side view illustrating a configuration of a connector cover at a cover position.

As illustrated in FIGS. 5 and 6, the connector cover 60 includes, at a cover position, an upper wall 60b covering a vertical upper side of the concave portion 80 and a side wall 60a covering the left lateral side of the concave portion 80 along a side wall of the rear housing 12R, where the connector cover 60 is inverted L-shaped in cross section, as viewed in a side view in the Y direction. The connector cover 60 also includes a rear wall 60c overhanging, in an inverted L-shape, from the side wall 60a and the upper wall 60b along a back face of the rear housing 12R.

The connector cover 60 includes a rotation shaft 61 having an axial core along the Y axis. A lower end portion of the rear wall 60c is coupled, via the rotation shaft 61, to the lower part at the left lateral side of the rear housing 12R. The rotation shaft 61 is located inward from the side wall 60a of the connector cover 60 when the connector cover 60 is located at the cover position. The connector cover 60 is configured to pivotally move in a movable manner, about the rotation shaft 61, to the cover position and the open position. Note that the cover position indicates a position at which the connector cover 60 covers the vertical upper side and the left lateral side of the concave portion 80 at which the cable gripping portion 82a is located. The open position indicates a position at which the connector cover 60 opens at least on the vertical upper side of the cable gripping portion 82a. The connector cover 60 of the embodiment opens, at the open position, the vertical upper side and the left lateral side of the concave portion 80 at which the cable gripping portion 82a is located.

An opening dimension L of the connector cover 60 at the open position is secured by 100 mm or greater. The opening dimension L has a length to open the vertical upper side of the cable gripping portion 82a along the opening face 80a at which the opening 81 is formed. In FIG. 5, the opening dimension L has a length along a horizontal direction between a left side wall 80b forming the concave portion 80 and a right end portion 60d of the rear wall 60c overhanging from the upper wall 60b of the connector cover 60.

According to amount of statistics by the Institute of Advanced Industrial Science and Technology, the width of the hands of Japanese is 79.8 mm on average for both genders (Kawauchi Makiko, 2012: AIST Dimension Data of the Hands of the Japanese. Available: https://www.dh.aist-.go.jp/database/hand/index.html.), securing the opening dimension L by 100 mm or greater allows the hand gripping the cable 82 to be easily inserted into the space having the opening dimension L.

The connector cover 60 is provided with a rotation restricting portion 64 for restricting an amount of pivotal movement of the connector cover 60. The rotation restricting portion 64 includes a plate member 62 overhanging from the rear wall 60c along a face of the rear wall 60c and having an elongated hole 62a along an arc in which the connector cover 60 pivotally moves in an arcuate shape about the rotation shaft 61, and a protrusion 63 provided at the back face of the rear housing 12R and slidably engaging with the elongated hole 62a. The connector cover 60 is configured such that an inner diameter end of the elongated hole 62a abuts against the protrusion 63 to prevent the connector cover 60 from opening by not less than the predetermined opening dimension L. This makes it possible to suppress a damage to the connector cover 60, which is caused by a collision of the connector cover 60 colliding with a floor surface on which the printer 11 is installed or a neighboring wall.

The rear wall 60c overhanging from the upper wall 60b of the connector cover 60 is provided with a display 65 indicating a type of the cable 82 connectable to the connector 71. The display 65 is marked at a position, on the rear wall 60c at the cover position, corresponding to an upper side of the opening 81 that is accessible to the two pieces of the connectors 71. In the embodiment, there are inscribed characters of "LAN" indicating the LAN cable and a symbol mark of the LAN cable, and characters of "USB" indicating the USB cable and a symbol mark of the USB cable.

As illustrated in FIG. 1, an upper face 60b1 of the connector cover 60 located at the cover position and an upper face 13b1 of the first feeding tray 13 located at the non-support position are included in an identical plane. Further, a front end portion 60b2 of the upper face 60b1 of the connector cover 60 located at the cover position and a front end portion 13b2 of the upper face 13b1 of the first feeding tray 13 located at the non-support position are aligned in an identical straight line shape. Note that the identical straight line and the identical plane tolerate errors due to processing accuracy and assembly accuracy at each of the portions.

Also, the side wall 60a of the connector cover 60 located at the cover position is located outward from a side wall of the cover 12C. The connector cover 60 is brought to the open position when connecting the cable 82 at a preparation stage prior to the installation of the printer 11, and is caused to return to the cover position after the connection is done. From this point forward in time, it is no longer necessary for the connector cover 60 to be at the open position, thus, there may be a case when the printer 11 is installed with the connector cover 60 in close contact with the wall. Even in this case as well, the cover 12C can be opened and closed. In other words, the printer 11 can be installed even in a narrow space.

Note that in the embodiment, the printer 11 of an inkjet type is exemplified as an example of the printer, however, a laser type printer may also be used. The printer may be used as an image scanner, a facsimile, a phone, a copying machine, and a combined machine in which two or more functions are combined.

As described above, the printer 11 according to the embodiment can achieve the advantageous effects described below.

The printer 11 includes the housing 12 having the opening 81 through which the connector 71 provided at the board 70 is accessible. The housing 12 includes the connector cover 60 covering, at the cover position, an upper side and a lateral side of the cable gripping portion 82a connected through the opening 81. This makes it possible to suppress a damage to the cable 82 and the connector 71 caused by the cable 82 connected to the connector 71, which is touched by the finger or hand of the user.

The opening dimension L of the connector cover 60 at the open position is secured by 100 mm or greater. This allows the hand of the user in a state of gripping the cable 82 to be easily inserted, thus improving workability when connecting the cable 82 to the connector 71.

The rear wall 60c of the connector cover 60 is provided with the display 65 indicating a type of the cable 82 connectable to the connector 71. Even when there are a plurality of the types of the cable 82 that are connectable, the user can easily determine a connection position of the cable 82.

The connector cover 60 includes the rotation shaft 61 that allows the connector cover 60 to be movable to the open position and the cover position. The rotation shaft 61 is located inward from the side wall 60a of the connector cover 60. This allows the printer 11 to be installed without creating any gap along the wall, thus reducing an installation space of the printer 11.

The upper face 60b1 of the connector cover 60 located at the cover position and the upper face 13b1 of the first feeding tray 13 located at the non-support position are included in an identical plane, thus improving design properties of the printer 11 and placement properties when placing an object on the housing 12.

The front end portion 60b2 of the connector cover 60 located at the cover position and the front end portion 13b2 of the first feeding tray 13 located at the non-support position are aligned in the identical straight line shape, thus improving the design properties of the printer 11 and the placement properties when placing the object on the housing 12.

What is claimed is:

1. A printer, comprising:
a board including a connector to which a cable is connected; and
a housing covering the board and having an opening through which the connector is accessible, wherein
a cable gripping portion that is gripped when the cable is connected is located outside the opening in a state where the cable is connected to the connector wherein
the housing includes
a connector cover movable to a cover position at which the connector cover covers an upper side and a lateral side of the cable gripping portion, and an open position at which the connector cover opens at least on a vertical upper side of the cable gripping portion.

2. The printer according to claim 1, wherein
the connector cover at the open position opens, on the vertical upper side of the cable gripping portion, by 100 mm or greater along an opening face at which the opening is formed.

3. The printer according to claim 1, wherein
the connector cover is provided with an indication indicating a type of the cable connectable to the connector.

4. The printer according to claim 1, wherein
the connector cover includes a rotation shaft about which the connector cover pivotally moves to the cover position and the open position, and wherein
the rotation shaft is located inward from a side wall of the connector cover when the connector cover is located at the cover position.

5. The printer according to claim 1, comprising
a medium support portion movable to a support position at which the medium support portion supports the recording medium and a non-support position different from the support position, wherein
an upper face of the connector cover located at the cover position and an upper face of the medium support portion located at the non-support position are included in an identical plane.

6. The printer according to claim 5, wherein
a front end portion of the connector cover located at the cover position and a front end portion of the medium support portion located at the non-support position are aligned in an identical straight line.

7. The printer according to claim 1, wherein
a cable restricting portion configured to restrict a movement of the cable is provided at a position covered by the connector cover located at the cover position.

* * * * *